April 26, 1932.   B. R. DELERAY   1,855,341
FRUIT JUICE EXTRACTOR
Filed Aug. 15, 1928
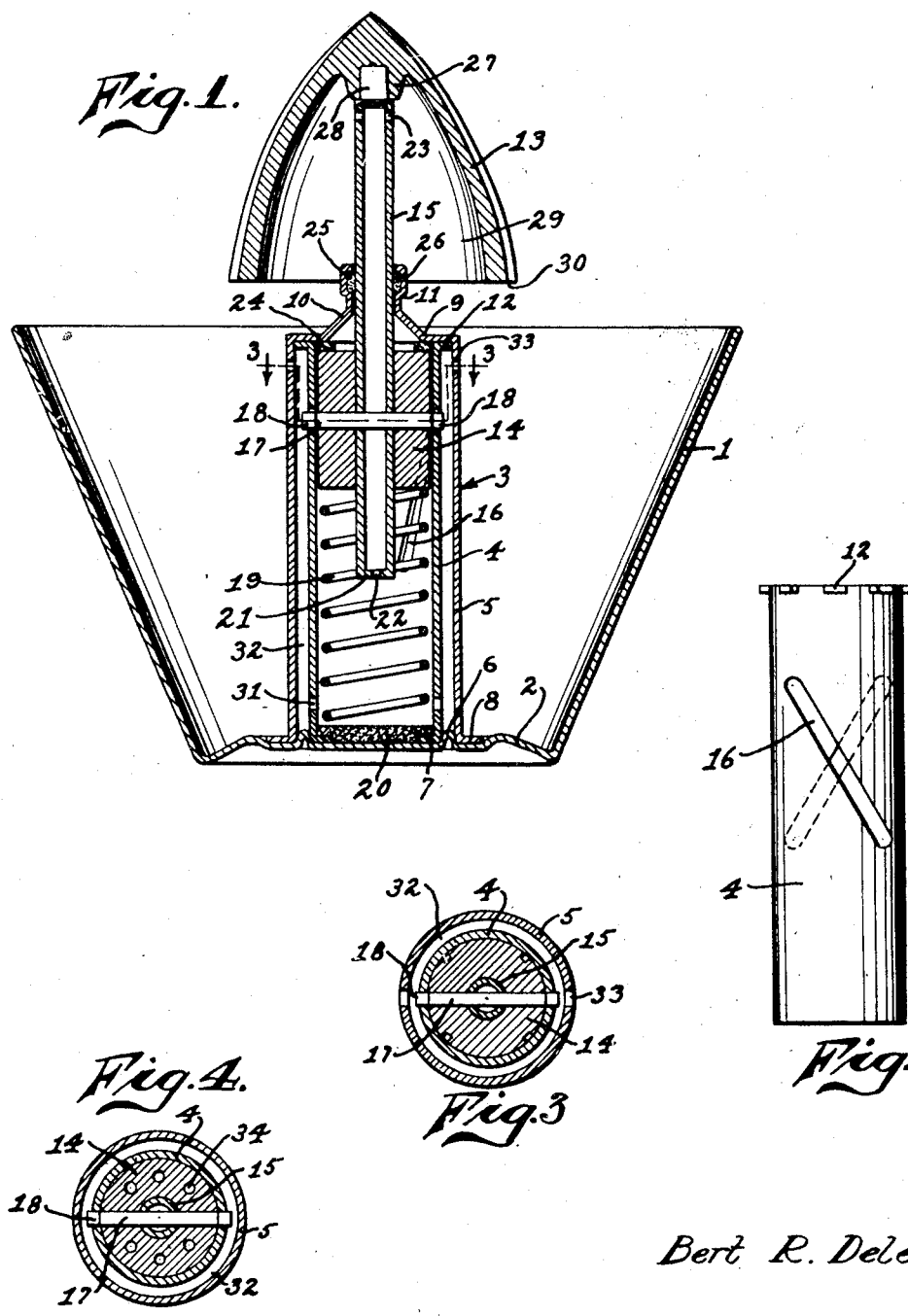
Inventor
Bert R. Deleray
By Lyon & Lyon
Attorneys Patented Apr. 26, 1932

1,855,341

UNITED STATES PATENT OFFICE

BERT R. DELERAY, OF LOS ANGELES, CALIFORNIA

FRUIT JUICE EXTRACTOR

Application filed August 15, 1928. Serial No. 299,707.

This invention relates to a fruit juice extractor of the type disclosed in my application for Letters Patent of the United States, Serial Number 268,127, entitled Juice extractor, and filed April 7, 1928.

In the extractor disclosed in that application, the construction included a sleeve extending upwardly from the center of a bowl; the sleeve was provided with an internally threaded bushing operating as a guide for a plunger in the form of a rod having threads co-operating with the threads of the bushing so that when the rod was depressed by pressing a half-fruit against the burr at the upper end of the rod, the rod would rotate and thereby rotate the burr. A spring was provided below the end of the rod to return the same to its elevated position after being depressed. In the operation of that device I have found that the thread connection between the rod and the bushing offers too much resistance to enable the device to operate satisfactorily, and furthermore, it is relatively expensive to form the threads in the bushing and on the rod. In addition to this, the downward movement of the rod compresses air in the lower chamber in the lower part of the bushing, and this increases the resistance to the downward movement of the plunger.

The general object of this invention is to provide a fruit juice extractor of this type, but having improved means for guiding the plunger or rod in its up and down movement; also to provide means for venting the chamber in the lower part of the guide, to the atmosphere.

In this type of juice extractor the upwardly extending guide sleeve is subjected to considerable strain, and one of the objects of the present invention is to provide a simple construction for this guide, which will give it rigidity, and which at the same time will facilitate constructing it in such a way as to effect the necessary rotation of the plunger as it reciprocates.

A further object of the invention is to construct the burr carried by the upper end of the plunger in such a way that it operates to prevent the juice from passing into the interior of the guide.

Further objects of the invention will appear hereinafter.

The invention consists in the novel parts and combination of parts to be described hereinafter, all of which contribute to produce an efficient fruit juice extractor.

A preferred embodiment of the invention is described in the following specification, while the broad scope of the invention is pointed out in the appended claims.

In the drawings:

Figure 1 is a vertical section through a juice extractor embodying my invention.

Figure 2 is a side elevation of the inner guide tube or shell for guiding the plunger.

Figure 3 is a cross-section through the device on the line 3—3 of Figure 1.

Figure 4 is a section through the device taken at the same point as Figure 3, but illustrating another embodiment of the means for venting the lower end of the guide cylinder or shell.

In practicing the invention I provide a bowl 1, preferably constructed of sheet metal, having a relatively large diameter at its upper edge, and having a bottom, 2, which is preferably made integral with the conical sidewall of the bowl. Extending up from the bottom 2, and preferably at the center thereof, I provide a guide sleeve 3, preferably in the form of a double-walled tubular shell, that is to say, this sleeve has an inner tubular shell, 4, and an outer tubular shell 5. The outer shell 5 is of considerably larger diameter than the inner shell. This is for the purpose of giving the sleeve 3 rigidity so that it will operate as a rigid post extending up from the bottom.

In order to facilitate the centering and attachment of the shells 4 and 5 to the bottom 2, I prefer to form the bottom 2 with a circular bead 6, formed by offsetting the metal of the bottom upwardly. (See Figure 1.)

The inner sleeve 4 is provided at its lower end with an inwardly bent flange 7 which is brazed, soldered or riveted, or otherwise secured, to the bottom 2 just inside of the bead 6. The outer sleeve 5 is similarly provided with a flange 8 at its lower end, but this flange projects outwardly and is brazed, soldered or riveted, or otherwise secured, to the bottom on the outer side of the bead 6. The bead 6 operates to center these two sleeves with respect to each other, and assists in providing rigidity in the double-walled guide sleeve 3, formed by the two center sleeves.

The upper end of the outer sleeve 5 is formed with an integral annular head 9, which is formed integral with a substantially conical inner portion 10 that is formed into a guide 11 of reduced diameter.

At the upper end of the sleeve 4, it is provided with integral outwardly extending lugs 12, which abut against the annular shoulder 9 on their upper faces and at their edges abut against the inner face of the outer shell 5.

The plunger guided in the sleeve 3 may be of any suitable construction enabling it to support a burr 13 that engages the under side of a half-fruit to extract its juice. However, this plunger preferably comprises a piston-like body 14, carrying a rod 15 that is secured to it and that extends up through the neck 11 to carry the burr.

In the operation of the device, the half-fruit is pressed down on the burr. I provide guiding means for rotating the plunger as this takes place. For this purpose I provide the wall of the inner shell 4 with one or more helical guideways which may be in the form of slots. In the present instance, I provide two such helical slots 16. (See Figure 2.) These slots are located diametrically opposite to each other and are engaged by means projecting into the slots from the body 14 of the plunger. The connection between the plunger and the sleeve 4 preferably consists of a cross-pin 17, the ends of which are provided with rollers 18 respectively, that roll in the slots.

I provide a spring for returning the plunger after it has been depressed, and I prefer to provide a coil spring 19 for this purpose, located in the lower end of the inner sleeve 4 and thrusting at its upper end against the under side of the body 14 of the plunger.

The cross-pin 17 may also operate to secure the rod 15 to the body 14.

In order to cushion the plunger at the bottom of its down stroke, I provide a buffer or cushion 20 on the bottom 2 at the lower end of the inner shell 4. The rod 15 is preferably of tubular form, and in order to prevent its lower end from cutting into this buffer, I turn the lower edge of the tube 15 inwardly to form a head 21, leaving a vent opening 22 to permit air to pass up the rod 15 and find exit at vents 23 at the upper end of the rod. The buffer 20 may be made of leather, rubber, or any other similar soft material.

In order to cushion the end of the up-stroke of the plunger, I provide an annular buffer 24, of soft material, attached to the upper face of the body 14 of the plunger. At the end of the up-stroke this buffer 24 strikes against the annular shoulder 9.

If desired, a packing ring 25 may be provided in the neck 11, which may be formed into an annular chamber 26 to receive the packing ring.

The burr 13 is preferably of curved conical form, and is in the form of a shell having a hub 27 at its upper end secured to an angular or square neck 28 formed at the upper end of the tubular rod 15. In this way a conical cavity 29 is formed on the under side of the burr 13 to provide clearance as the burr descends. In other words, the lower edge 30 of the burr is located at or about the level of the neck 11, so that it operates as an apron to prevent the extracted juice from splashing onto the side of the rod 15 in such a way that it could be carried into the interior of the sleeve. In this way I protect the plunger and the interior of the sleeve from contact with the juices, which are acid and which would tend to corrode the metal parts.

As regards the feature of venting the lower end of the sleeve 4 to the atmosphere, it should be understood that as the body 14 of the plunger descends, and after its lower end passes the lower ends of the slots 16, the body 14 would operate to compress air in the lower end of the sleeve. However, this air may escape through the tubular plunger 15.

If desired, an additional vent may be provided by forming an opening 31 through the wall of the inner sleeve 4 near its lower end, so as to permit the air to escape into the annular space 32 in the wall of the post 3.

If desired, another vent opening 33 can be provided in the outer wall 5 near its upper end.

Instead of venting the lower end of the guide sleeve 3 in this way, I may vent it in the manner illustrated in Figure 4, by providing the body 14 with a plurality of openings 34 passing vertically through it.

By reason of the fact that the cross-pin 17 is engaged at diametrically opposite points with respect to the axis of the plunger, by the edges of the slots 16, it will be evident that the forces acting upon the plunger to rotate it constitute a couple. For this reason there is practically no lateral strain on the plunger and it rotates with great freedom.

It is advantageous to give the guide tube 4 considerable diameter. By doing this, the reactive forces of the edges of the slots on the ends of the pin 17 are greatly reduced.

It is understood that the embodiment of the invention described herein is only one of the many embodiments this invention may take, and I do not wish to be limited in the practice of the invention, nor in the claims, to the particular embodiment set forth.

What I claim is:

1. In a fruit juice extractor, the combination of a guide in the form of a cylinder, a plunger mounted to slide in the guide, a burr carried by the plunger adapted to rotate and extract the juice of a half-fruit when pressed down upon the same, means associated with the guide for rotating the plunger when the same is depressed by the pressure of the fruit against the burr, means for venting the interior of the cylinder below the plunger to permit free downward movement of the plunger, and means for returning the plunger, a bowl, and means for attaching the base of the cylinder to the bowl to seal the interior of the cylinder from the entry of fruit juices.

2. In a fruit juice extractor, the combination of a guide in the form of a cylinder, a plunger mounted to slide in the guide, a burr carried by the plunger adapted to rotate and extract the juice of a half-fruit when pressed down upon the same, said cylinder having a pair of oppositely disposed helical guide ways in the wall thereof, said plunger having a pin with its ends projecting into the said guide ways and operating to rotate the plunger when the same is depressed by the pressure of the fruit against the burr, and a spring cooperating with the plunger to return the same to an elevated position after it has been depressed.

3. In a fruit juice extractor, the combination of a guide in the form of a cylinder, a plunger mounted to slide in the guide, a burr carried by the plunger adapted to rotate and extract the juice of a half-fruit when pressed down upon the same, said cylinder having a pair of opposite helical slots in the wall thereof, a transverse pin securing the plunger to the rod, with its ends projecting into the said slots and cooperating with the slots to rotate the plunger when the same is depressed by the pressure of the fruit against the burr, and a spring in the lower end of the cylinder to return the plunger to its elevated position after it has been depressed.

4. In a fruit juice extractor, the combination of a bowl having a bottom with an upwardly extending post, said post having an inner tubular shell and an outer liquid-tight tubular shell rigidly secured to the said bottom, a plunger guided in the inner tubular shell and having a rod secured thereto and extending upwardly above the upper end of the post, a burr carried by the upper end of the rod adapted to rotate and extract the juice of a half-fruit when pressed down upon the same, said inner tubular shell having a pair of oppositely disposed helical guide slots formed therein, said plunger having means projecting into the said guide slots cooperating with the same to rotate the plunger when the same is depressed by the pressure of the fruit against the burr, and a spring for returning the plunger to its elevated position after the same has been depressed.

5. In a fruit juice extractor, the combination of a bowl having a bottom with an upwardly extending post, said post having an inner tubular shell and an outer liquid-tight tubular shell rigidly secured to the said bottom, a plunger guided in the inner tubular shell and having a rod secured thereto and extending upwardly above the upper end of the post, a burr carried by the upper end of the rod adapted to rotate and extract the juice of a half-fruit when pressed down upon the same, said inner tubular shell having a pair of oppositely disposed helical guide slots formed therein, said plunger having means projecting into the said guide slots cooperating with the same to rotate the plunger when the same is depressed by the pressure of the fruit against the burr, and a spring for returning the plunger to its elevated position after the same has been depressed, and a buffer for cushioning the plunger at the end of its downward movement.

6. In a fruit juice extractor, the combination of a bowl having a bottom with an upwardly extending post, said post having an inner tubular shell and an outer liquid-tight tubular shell rigidly secured to the said bottom, a plunger guided in the inner tubular shell and having a rod secured thereto and extending upwardly above the upper end of the post, a burr carried by the upper end of the rod adapted to rotate and extract the juice of a half-fruit when pressed down upon the same, said inner tubular shell having a pair of oppositely disposed helical guide slots formed therein, said plunger having means projecting into the said guide slots co-operating with the same to rotate the plunger when the same is depressed by the pressure of the fruit against the burr, and a spring for returning the plunger to its elevated position after the same has been depressed, and a buffer for cushioning the plunger at the end of its upward stroke.

7. In a fruit juice extractor, the combination of a guide in the form of a tubular shell formed of a flat plate rolled into cylindrical form and having a helical slot formed in the wall thereof, a plunger mounted to slide in the guide and having means engaging the slot to cause rotation of the plunger when the same is depressed, a burr carried by the plunger adapted to rotate and extract the juice of a half-fruit when pressed down upon the same, and means for returning the plunger to its elevated position after the same has been depressed.

8. In a fruit juice extractor, the combination of a bowl having an upwardly extending post projecting up from its bottom, a plunger guided to reciprocate in the said post, a burr attached to the upper end of the plunger having substantially the form of a conical shell, with the lower edge of the shell extending down to about the level of the upper end of the post, whereby the lower edge of the burr operates as an apron to prevent extracted juice from passing into the guide.

9. In a fruit juice extractor, the combination of a tubular post supported with its axis substantially vertical, a plunger guided to move up and down in the said post, said post having slots on the interior thereof, said plunger having two members projecting outwardly therefrom and engaging the slots at diametrically opposite points to cause a rotation of the plunger when the same is depressed, a stem attached to the plunger and extending upwardly past the upper end of the post, and a burr carried by the upper end of the stem to receive the half-fruit and operating when depressed by pressure on the half-fruit, to cause rotation of the burr.

10. In a fruit juice extractor, the combination of a bowl, a guide in the form of a cylinder extending up from the bottom of the bowl, a plunger mounted to slide in the guide, an outer liquid-tight sleeve surrounding the guide and excluding the juice from the guide, a burr carried by the plunger adapted to rotate and extract the juice of a half-fruit when pressed down upon the same, means associated with the guide for rotating the plunger when the same is depressed by the pressure of the fruit against the burr, means for venting the interior of the cylinder below the plunger to permit free downward movement of the plunger, and means for returning the plunger.

11. In a fruit juice extractor, the combination of a bowl, a guide in the form of a cylinder extending up from the bottom of the bowl, a plunger with a rod, mounted to slide in the guide, a liquid-tight outer sleeve enveloping the guide and excluding the juices from the guide, a burr carried by the rod, adapted to rotate with the plunger and extract the juice of a half-fruit when pressed down upon the same, means associated with the guide for rotating the plunger when the same is depressed by the pressure of the fruit against the burr, said rod being of tubular form so as to present an air duct extending upwardly from the lower end thereof to the upper end, the upper end of said plunger above the guide having vents therein to permit free ingress and egress of air from the cylinder when the plunger is reciprocated.

12. In a fruit juice extractor, the combination of a tubular post supported with its axis substantially vertical, a plunger mounted within the post, said post and said plunger having cooperating means on one side of the axis including a helical guide-way, and having cooperating guide means located on the opposite side of the post and including a second helical guide-way, said plunger having a member extending transverse to said post and having portions engaging both of said guideways, said plunger having a stem of plain, cylindrical form extending upwardly past the upper end of the post, and a burr carried by the upper end of the stem to receive a half fruit, said parts cooperating when pressure is exerted on the half fruit to cause rotation of the burr.

Signed at Los Angeles, California, this 3 day of August, 1928.

BERT R. DELERAY.